United States Patent
Kawamura et al.

(10) Patent No.: US 8,537,651 B2
(45) Date of Patent: Sep. 17, 2013

(54) OPTICAL DISC DEVICE

(75) Inventors: Tomoto Kawamura, Yokohama (JP); Kotaro Oishi, Fujisawa (JP); Masayuki Kobayashi, Kuki (JP); Hideo Suenaga, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/372,550

(22) Filed: Feb. 14, 2012

(65) Prior Publication Data
US 2012/0218872 A1    Aug. 30, 2012

(30) Foreign Application Priority Data
Feb. 28, 2011  (JP) .................................. 2011-041096

(51) Int. Cl.
*G11B 7/00*    (2006.01)
(52) U.S. Cl.
USPC ....................................................... 369/116
(58) Field of Classification Search
USPC ................ 369/47.51, 116, 47.52, 47.53, 120, 369/121, 122
See application file for complete search history.

(56) References Cited

U.S. PATENT DOCUMENTS

| | | | | |
|---|---|---|---|---|
| 7,450,480 B2* | 11/2008 | Narumi et al. | ............... | 369/47.5 |
| 7,593,301 B2* | 9/2009 | Kim | ........................... | 369/59.11 |
| 7,663,994 B2* | 2/2010 | Watanabe et al. | ............ | 369/47.5 |
| 7,835,254 B2* | 11/2010 | Adachi et al. | ................. | 369/116 |

FOREIGN PATENT DOCUMENTS

| | | |
|---|---|---|
| JP | 3-141039 | 6/1991 |
| JP | 2004-199768 | 7/2004 |
| JP | 2011-100513 | 5/2011 |

* cited by examiner

*Primary Examiner* — Nabil Hindi
(74) *Attorney, Agent, or Firm* — Antonelli, Terry, Stout & Kraus, LLP.

(57) ABSTRACT

An optical disc device includes an optical source for emitting an optical beam, an incident intensity control circuit for controlling an intensity of the optical beam emitted from the optical source, an objective lens for focusing the optical beam on an optical disc, an optical detector for receiving the optical beam reflected from the optical disc, and a servo signal generation circuit for generating a focus error signal from the optical detector, by this configuration, the optical beam is varied once to a third optical beam intensity to be present in between a first optical beam intensity and a second optical beam intensity when varying from the first optical beam intensity up to the second optical beam intensity different from the first optical beam intensity, and the incident intensity control circuit is controlled such that the variation of focus error signal is not exceeded over a predetermined range.

10 Claims, 9 Drawing Sheets

OPTICAL DISC DEVICE

INCORPORATION BY REFERENCE

The present application claims priority from Japanese application JP2011-041096 filed on Feb. 28, 2011, the content of which is hereby incorporated by reference into this application.

BACKGROUND OF THE INVENTION

The present invention relates to an optical disc device capable of reproducing and recording information on optical discs.

JP-A-3-141039 discloses a chromatic aberration correction means to give a focus error signal an offset, and JP-A-2004-199768 also discloses the chromatic aberration correction means not to generate the chromatic aberration from optical components, as background art in the technical field.

SUMMARY OF THE INVENTION

The optical disc has been standardized as BD (Blu-ray Disc), DVD (Digital Versatile Disc), CD (Compact Disc), etc. In the optical disc device for recording and reproducing the information on the optical disc, a position of an objective lens is controlled by a servo control in such a way that an optical beam, emitted from a semiconductor laser diode (hereinafter, referred to as LD) as an optical source, is focused on the optical disc by the objective lens, the optical beam reflected at the optical disc is detected by an optical detector, a track error signal (hereinafter, referred to as TE) and a focus error signal (hereinafter, referred to as FE), etc. are generated, and the optical beam is focused on a predetermined position of the optical disc.

In this case of the optical disc device, it is required to instantly raise an intensity of the optical beam emitted from the LD up to a predetermined intensity when recording the information on the optical disc. The intensity of the optical beam emitted from the LD is referred to as LD intensity. Raising the LD intensity causes varying a wavelength of the optical beam emitted from the LD, therefore, a chromatic aberration generates in the optical beam focused on the optical disc. In consequence, the focus is deviated from a just-focused position to become a so-called defocused condition. Such instantly increased chromatic aberration has a frequency higher than a servo controllable frequency, therefore, a degradation of recording quality arises for a predetermined time period by causing the defocus.

The optical components provided in the optical disc device have more than a little of a dispersing characteristic indicating that a refraction index is varied by a wavelength. By varying the wavelength, an optical path varies when the optical beam passes through the optical components, which causes the chromatic aberration. Particularly, a focal distance of the objective lens is short, such as 1 mm to 3 mm. Therefore, the curvature radius of objective lens is small, which is a main cause of generating the chromatic aberration.

For a purpose of realizing a single objective lens satisfying plural standards for such as the above-mentioned BD, DVD, etc., it is required to correct an error such as NA (Numerical Aperture) and the thickness of cover glass, and a diffraction phenomenon should be used. Normally, the diffraction phenomenon emerges as a large variation of a diffraction angle caused by the wavelength deviation. For this reason, the above-mentioned chromatic aberration generates largely in the objective lens using the diffraction phenomenon.

In the case of using such objective lens having the large chromatic aberration, the offset is given to the FE, as disclosed in JP-A-3-141039, to arise a new problem such that a track control becomes disabled since the offset for the FE is too large and a focus control becomes unstable since the objective lens is accelerated too much. Using the optical components as disclosed in JP-A-2004-199768 generates a problem such that an unnecessary optical beam generates as a disturbance in these components. As a result, a transmission effect is low, a cost increase is inescapable, etc.

An object of the invention is to provide a servo control realized by a simple configuration of the optical disc device capable of recording and reproducing stably, even in the chromatic aberration generated in the objective lens using the diffraction phenomenon.

The above-mentioned object can be realized by a configuration written in the claims as an example.

According to the invention, an economical optical disc device can be realized.

The other objects, features and advantages of the invention will become apparent from the following description of the embodiments of the invention taken in conjunction with the accompanying drawings.

DESCRIPTION OF THE EMBODIMENTS

Hereinafter, embodiments of the invention will be described with reference to the drawings, but the invention is not limited to the following description.

Embodiment 1

A first embodiment of the invention will be described with reference to the drawings. Here, the description will be concerned with an operation of an optical disc device 001 when recording information, as an example.

Figure 1:
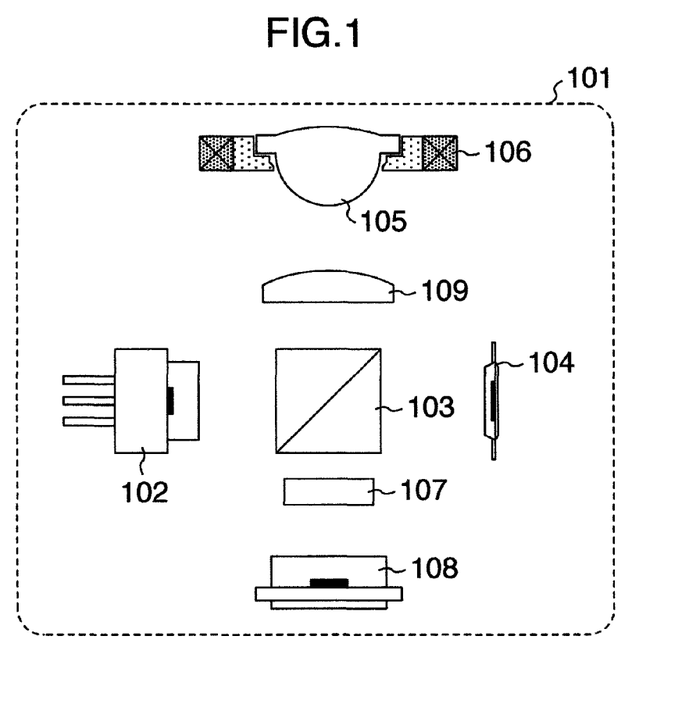
FIG. 1 is a schematic configuration diagram showing an optical head 101 in a first embodiment of the invention.

First, an optical head 101 provided in the optical disc device 001 will be described below. FIG. 1 is a schematic configuration diagram showing the optical head 101. An optical beam is emitted from an LD (semiconductor Laser Diode) 102 as a diverging beam. A semiconductor laser is used generally for recording and reproducing information on an optical disc, and the LD 102 is a semiconductor laser for emitting the optical beam having a predetermined wavelength. The optical beam emitted from the LD 102 is incident into an optical beam splitter 103. The optical beam splitter 103 makes the incident optical beam having a predetermined LD intensity penetrate itself and reflect a remaining optical beam, that is, the optical beam splitter 103 is an optical element from which the optical beam is diverged into two. Such abovementioned function can be realized by a half prism, a polarization prism, etc., for example. Of the optical beam incident into the optical beam splitter 103, the reflected optical beam moves forward a collimate lens 109, and the optical beam penetrated through it moves forward a front monitor 104 as an optical intensity detector.

Generally, the LD intensity is proportionate to a signal amount to be entered, but, the LD intensity has a problem such that it has a large offset individually and varies in response to an ambient temperature, etc. Therefore, the LD intensity to be irradiated on the optical disc should be controlled accurately when reproducing the optical disc, particularly recording thereon. For this reason, the optical head 101 is configured such that it can perform a feedback control so as to make the LD intensity on the optical disc to a predetermined value, by penetrating the optical beam through the optical beam splitter 103 and detecting the diverged LD intensity by the front monitor 104.

The optical beam moved forward the collimate lens 109 is converted into a substantially paralleled optical beam by the collimate lens 109. The optical beam passed through the collimate lens 109 is focused and irradiated on an information surface of the optical disc (not shown) by the objective lens 105. The objective lens 105 is mounted on an actuator 106 as an objective lens drive device and configured such that it can be driven, at least, in a direction perpendicular to a track on the information surface of optical disc and in a normal direction (vertical direction along the plane of paper) on the information surface of optical disc. In addition, the direction perpendicular to the track is used for a track control in response to TE (Track Error signal) and for a drive in a lens shift, and the normal direction on the information surface is used for a focus control in response to FE (Focus Error signal). The optical beam reflected from the optical disc passes through the objective lens 105, collimate lens 109, optical beam splitter 103 and an optical detection element 107 to then be detected by an optical detector 108. The optical detection element 107 is an optical element for providing an astigmatism to generate the FE by an astigmatic method and the TE by a push-pull method. Such above-mentioned optical element can be realized by a cylindrical lens etc. Necessary optical information of the optical disc, such as the FE, TE, a reproduced signal, etc. is output, as a signal, from the optical detector 108. In addition, the optical head may be configured by any configuration if it can generate the FE and TE, and it may also be configured such that a method of generating the FE and TE, different from the astigmatic method and push-pull method, is used.

Figure 2A:
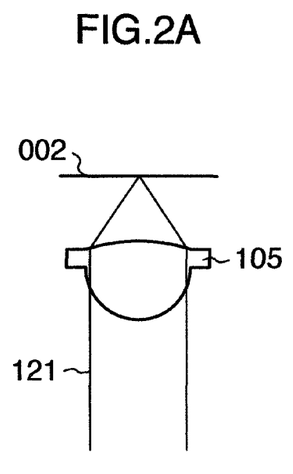
FIGS. 2A, 2B and 2C are schematic diagrams for explaining the chromatic aberration in the first embodiment.
Figure 2B:
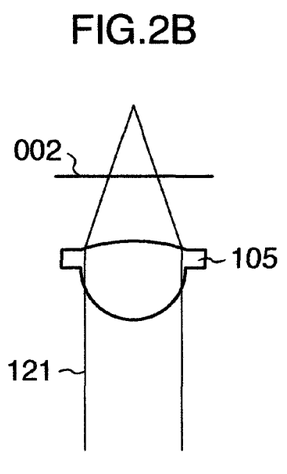
Figure 2C:
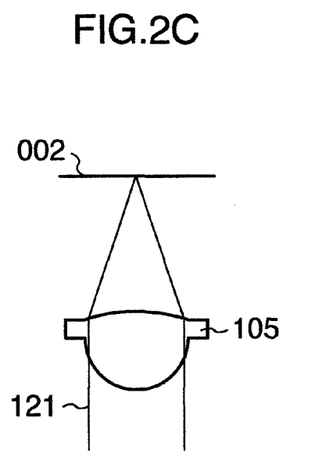

Next, a chromatic aberration will be described with reference to FIGS. 2A, 2B and 2C, each of which shows a relation between an optical disc 002 and the objective lens 105. As shown in FIG. 2A, an optical beam 121 incident from the collimate lens 109 is irradiated on the optical disc 002 by the objective lens 105. At this time, the optical beam 121 is just-focused on the optical disc 002. Incidentally, the optical beam 121 passed through the objective lens 105 is converted into an optical beam which is just-focused on a farther position (upper side of FIG. 2B) than the optical disc 002 as shown in FIG. 2B, when the LD intensity is made large. This is because the wavelength of LD is varied to a long wavelength side and a focal distance is extended virtually due to a wavelength dependence property of objective lens 105, since the LD intensity is made large. This phenomenon is referred to as a chromatic aberration in this embodiment. As mentioned above, the objective lens using a diffraction phenomenon generates the chromatic aberration largely in principle. When such chromatic aberration is generated, the reproduction and recording cannot definitely be performed in the optical disc device, and a servo control for both a track control and focus control becomes disabled. For this reason, the objective lens 105 is positioned father from the optical disc 002 as shown in FIG. 2C, and it is required to control such that the optical beam 121 is just-focused on the optical disc 002 again. Incidentally, a direction in which the objective lens 105 moves close to the optical disc 002 is defined as in-focus, and a direction in which the objective lens 105 moves farther from the optical disc 002 is defined as out-focus.

Figure 3:
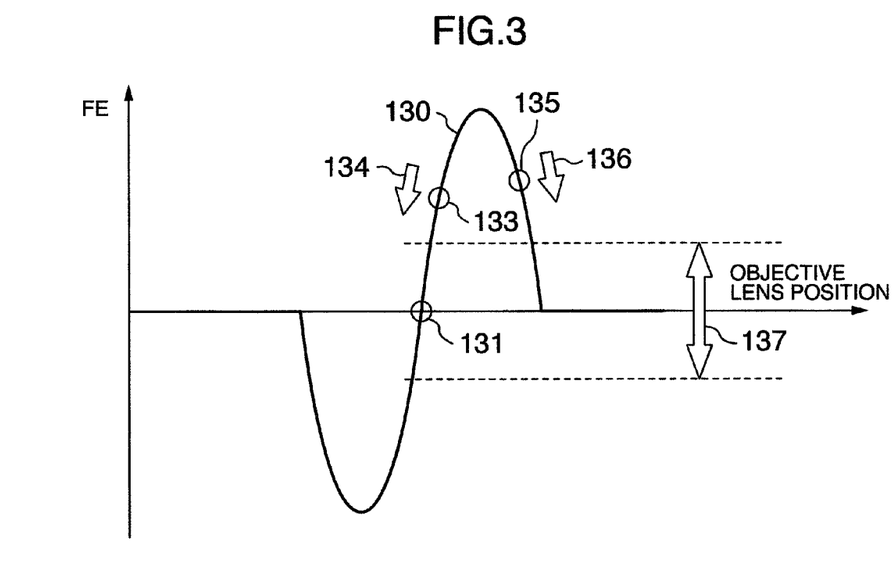
FIG. 3 is a diagram for explaining the FE in the first embodiment.

Next, the focus control will be described with reference to FIG. 3 as a diagram showing the FE. A horizontal axis shows the position of objective lens 105 in the normal direction of the optical disc 002, and the right side on the plane of paper shows a direction becoming the in-focus. FE 130 shows normally a sigmoidal curve as shown in FIG. 3. A position in between on the sigmoidal curve shows a just-focal point 131. The FE 130 is displaced to a positive side (upper side on the plane of paper) when moving from the just-focal point 131 to the in-focus and displaced to a negative side (lower side of the plane of paper) when moving from the just-focal point 131 to the out-focus. A signal amplitude of the TE generated by the push-pull system etc. is decreased in response to a defocus amount in a defocus condition. Since the track control becomes disabled when the TE becomes smaller than a predetermined amplitude, a range of the FE for which the track control can be performed is set to a TE allowable range 137. Normally, the track control becomes disabled when the amplitude of TE becomes −6 dB, but depending on the configuration of control system. To this end, the TE allowable range 137 may be set to a range for which the amplitude of TE becomes −4 dB, including margin, for example.

The focus control is that the actuator 106 is controlled such that the objective lens 105 is moved so as to make the FE positive, when the FE becomes negative. Conversely, the actuator 106 is controlled so as to make the FE negative by moving the objective lens 105, when the FE becomes positive. As mentioned above, the focus control performs such that the FE always becomes the just-focal point 131. For example, assuming that the LD intensity is raised to generate the chromatic aberration and the FE is displaced up to a point 133, the actuator 106 is controlled to move the objective lens 105 in a direction (arrow 134) to which the FE is displaced up to the negative, that is, to which the FE displaced in the out-focus since the FE is positive at this time, and the objective lens 105 is returned to the just-focus point 131. In the focus control as mentioned above, it requires a time for returning from the point 133 to the just-focal point 131 in accordance with a displace amount of the FE. The track control becomes disabled since the point 133 is exceeded over the TE allowable range 137. In fact, since it is equivalent that the track control is turned off once, it is required to search a designated track so that the track control starts again, and such operation requires a certain extent of time. In the case of objective lens 105 using the above-mentioned diffraction phenomenon, the FE is sometimes displaced up to a point 135 since the chromatic aberration generates largely. In also this case, the objective lens 105 is moved in the direction (arrow 136) to which the FE is displaced to the negative since the FE is positive, that is, the actuator 106 is controlled in the direction to which the in-focus is performed. That is, the optical disc device 001 cannot return to the just-focal point 131, therefore, the focus control becomes a disabled condition. The optical disc device 001 should have the servo control in such a way that the track control and focus control do not become disabled, is mentioned above.

Figure 4:
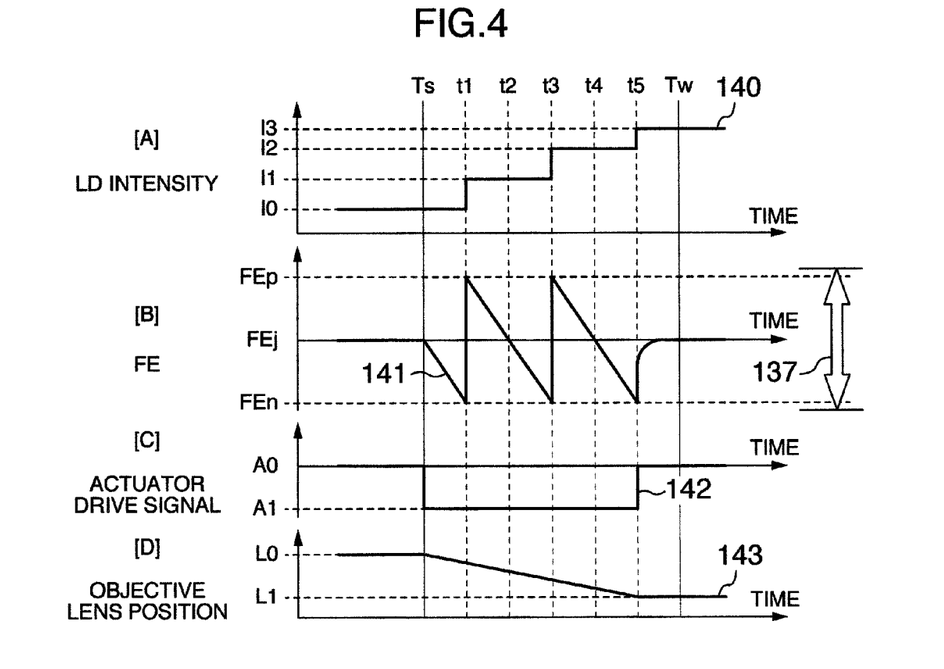
FIG. 4 is a diagram for explaining a control method for an optical disc device 001 in the first embodiment.

Next, a control method for the optical disc device 001 in the recording will be described with reference to FIG. 4. FIG. 4 shows a control example in the optical disc device 001 when the LD intensity is raised from I0 in the reproduction up to a targeted LD intensity I3 in the recording. FIG. 4 also shows a time on the horizontal axis, and the LD intensity as A, the FE as B, an actuator drive signal as C and an objective lens position as D on the vertical axis. The right direction on the plane of paper shows that the time progresses. An objective lens position indicates that the positive (upper side on the plane of paper) corresponds to the position of in-focus side. The right side on the plane of paper indicates a direction to which the time elapses.

In FIG. 4, a condition where the focus control and track control are performed is assumed in a preceding time earlier than a time Ts. That is, in the preceding time earlier than time Ts, an LD intensity 140 is set to I0 in the reproduction, an FE 141 is set to a just-focal point FEj since the focus control is underway, an actuator drive signal 142 is set to a predetermined value A0, and the objective lens position is set to a predetermined value L0. In addition, an arrow indicates the TE allowable range 137, which indicates a value set to a range for which FEp is not exceeded over the upper limit of TE allowable range 137 and to a range for which FEn is not exceeded over the lower limit of TE allowable range 137.

When the optical disc device 001 receives a recording instruction at time Ts, the focus control stops temporarily, and a predetermined signal A1 is entered as the actuator drive signal 142 so as to become the out-focus. The objective lens position 143 is moved from L0 to the out-focus side by the entered actuator drive signal 142. At this time, the FE 141 is displaced to the negative side in response to the objective lens position 143.

When the FE 141 is reached to the FEn or a time t1, the LD intensity 140 is raised from I0 to I1. At a moment of raising the LD intensity to I1, the chromatic aberration generates in the optical beam. Since the defocus caused by the chromatic aberration is faster than a servo controllable frequency band, the FE 141 is displaced at a moment up to the FEp as positive. The optical disc device 001 should learn a relation of the LD intensity and the displacement amount of FE caused by the chromatic aberration in advance. The LD intensity 140 is then raised in the range for which the FE 141 is not exceeded over the FEp, from the data learned in advance.

The signal A1 is continuously entered as the actuator drive signal 142 even on the operation for raising the LD intensity 140 at time t1. For this reason, the objective lens position 143 moves continuously to the out-focus side. The FE 141 is displaced to the negative side along the movement of objective lens position 143. In addition, the FE 141 is displaced by causing the chromatic aberration when the LD intensity 140 is raised, but the objective lens position 143 depends only on the actuator drive signal 142 and is not affected by the chromatic aberration.

When a time t2 is elapsed and the FE 141 is reached to the FEn again or a time t3, the LD intensity 140 is raised from I1 to I2. At a moment of raising to I2, the FE 141 displaced up to the FEp for a moment, likewise the above mentioned. The signal A1 is continuously entered as the actuator drive signal 142 even when the LD intensity 140 is raised at time t3, and the objective lens position 143 moves continuously to the out-focus side. The FE 141 is also displaced to the negative side from the FEp, along the movement of objective lens position 143.

When a time t4 is elapsed and the FE 141 is reached to FEn in third time or at the time t5, the LD intensity 140 is raised from I2 to I3. At a moment of raising the LD intensity to I3, likewise, the chromatic aberration generates in the optical beam. When the LD intensity 140 is reached as targeted I3, it is required to start the focus control. The LD intensity 140 is raised such that the FE 141 is displaced to FEj, not to FEp, when the LD intensity is raised from I2 to I3.

At time t5, the focus control starts after returning the actuator drive signal 142 from A1 to A0. The objective lens position 143 stops at a position L1 where the focus control starts since the actuator drive signal 142 disappears at time t5.

By controlling as mentioned above, it enables that the LD intensity is raised up to a target without disabling the track control. In addition, when a necessary raising amount of the LD intensity is smaller than the displacement from FEn up to FEj at the time of raising the LD intensity 140 from I2 up to I3, it is definitely unnecessary to wait until the FE 141 reaches the FEn and it may also be acceptable that the LD intensity 140 is raised to a value between the FEj and FEn. In this embodiment, it has been described that the LD intensity is raised from I0 up to I3 in three steps, but the step in twice or four times may also be acceptable. Any controls may also be acceptable to monitor such that FE 141 does not exceed over the TE allowable range 137.

Figure 5:
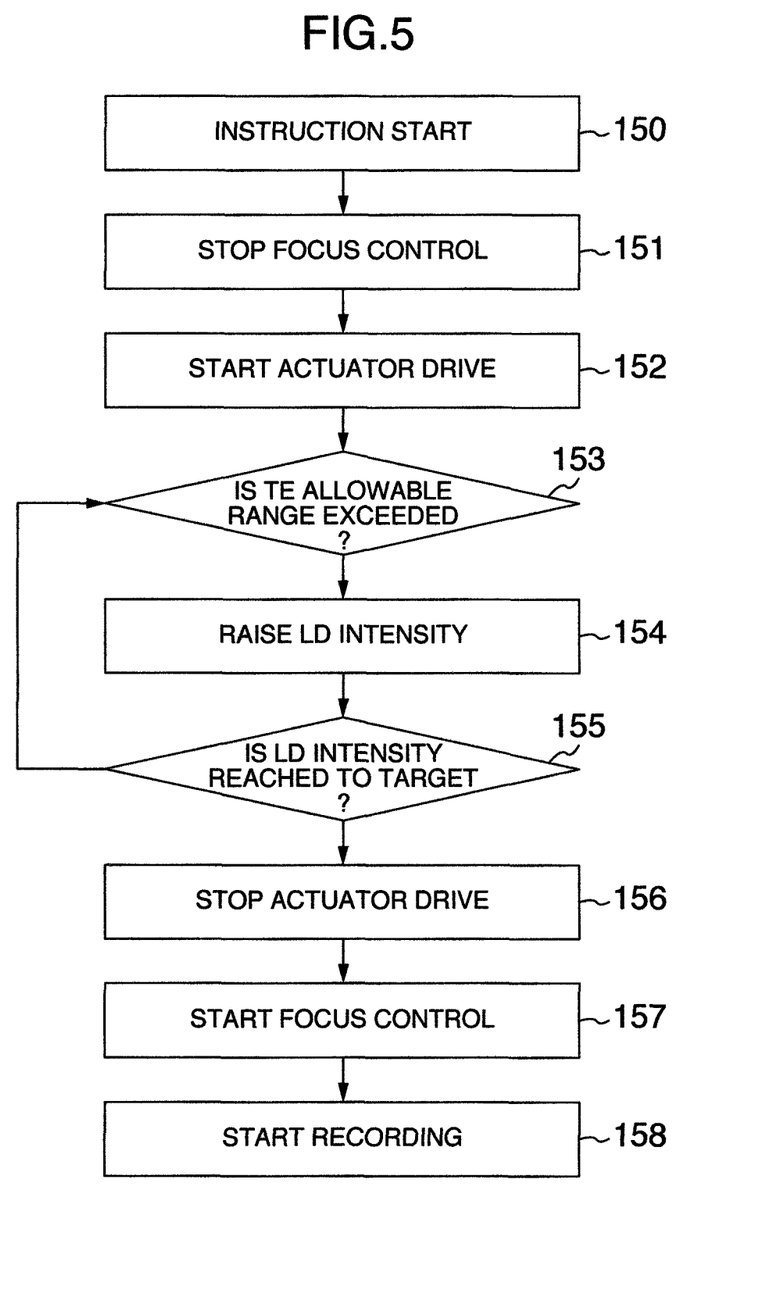
FIG. 5 is a flowchart showing an operation sequence of the optical disc device 001 in the first embodiment.

An operation of the optical disc device 001 will be described with reference to FIG. 5. FIG. 5 is a flowchart showing that the LD intensity is raised in the recording. First, the optical disc device 001 receives an instruction for starting a recording operation, at a step 150. Subsequently, the focus control is stopped, at a step 151. The actuator drive signal is then infused, at a step 152. The FE is monitored at a step 153, and it waits until the FE becomes a value set in the range for which the value does not exceed over the TE allowable range 137, at a step 153. The LD intensity is raised when the FE becomes a setting value, at a step 154. At this time, the LD intensity is monitored by the front monitor 104, at a step 155. When the LD intensity does not reach the target, the FE is monitored again and it is waited that until the FE becomes the value set in the range for which the value does not exceed over the TE allowable range 137, at the step 153. When the FE becomes the setting value, the LD intensity is raised, at the step 154. The above-mentioned process is repeated, and the signal driven to the actuator 106 is stopped, at a step 156, when the LD intensity reaches the target value in the front monitor 104, at the step 155. The focus control then starts, at a step 157.

As mentioned above, the LD intensity reaches the target, both the focus control and track control are normal, and the recording can be started, at a step 158.

Figure 6:
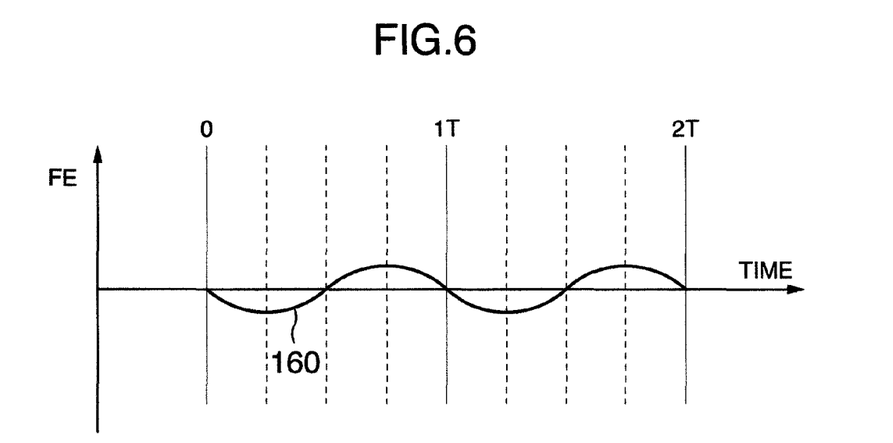
FIG. 6 is a diagram for explaining a relation between an in-plane deflection of an optical disc in the first embodiment.

FIG. 6 shows a relation between the in-plane deflection of the optical disc 002 and FE. The optical disc generates the in-plane deflection corresponding to a defocus for a rotation period of the optical disc, by causing a manufacturing error, a mounting error of the optical disc on the optical disc device, etc. FE 160 is displaced as shown in FIG. 6, by causing the in-plane deflection for rotation period T. In the above-mentioned case, a principle operation has been described for simplicity, regardless of the in-plane deflection. The actual optical disc device learns the displacement of FE caused by the in-plane deflection in advance and it may be operated by superimposing a signal caused by the in-plane deflection on the actuator drive signal 142, since the FE 160 is always displaced by the in-plane deflection. The above-mentioned failure, caused by the rotation position of optical disc, of raising the LD intensity can be eliminated by considering the in-plane deflection of optical disc 002.

Figure 7:
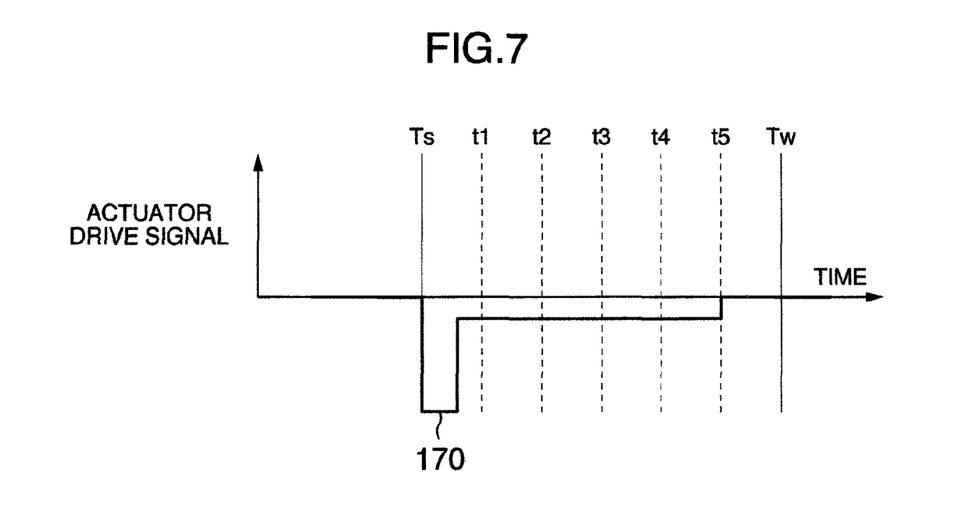
FIG. 7 is a diagram for explaining an actuator drive signal in the first embodiment.

FIG. 7 shows an actuator drive signal 170. The actuator drive signal 170 is a deforming example of the actuator drive signal 142. A linear movement of objective lens 105 cannot be realized by only supplying a simple rectangular wave signal since the initial motion of actuator 106 is slow caused by the weight of objective lens 105. For this reason, a drive signal immediately after the start may be made large as shown the actuator drive signal 170 in FIG. 7 so that the speed of initial moment is improved. The signal caused by the above-mentioned in-plane deflection of optical disc is superimposed on the actuator drive signal 170, so that a more accurate control can be performed.

Figure 8:
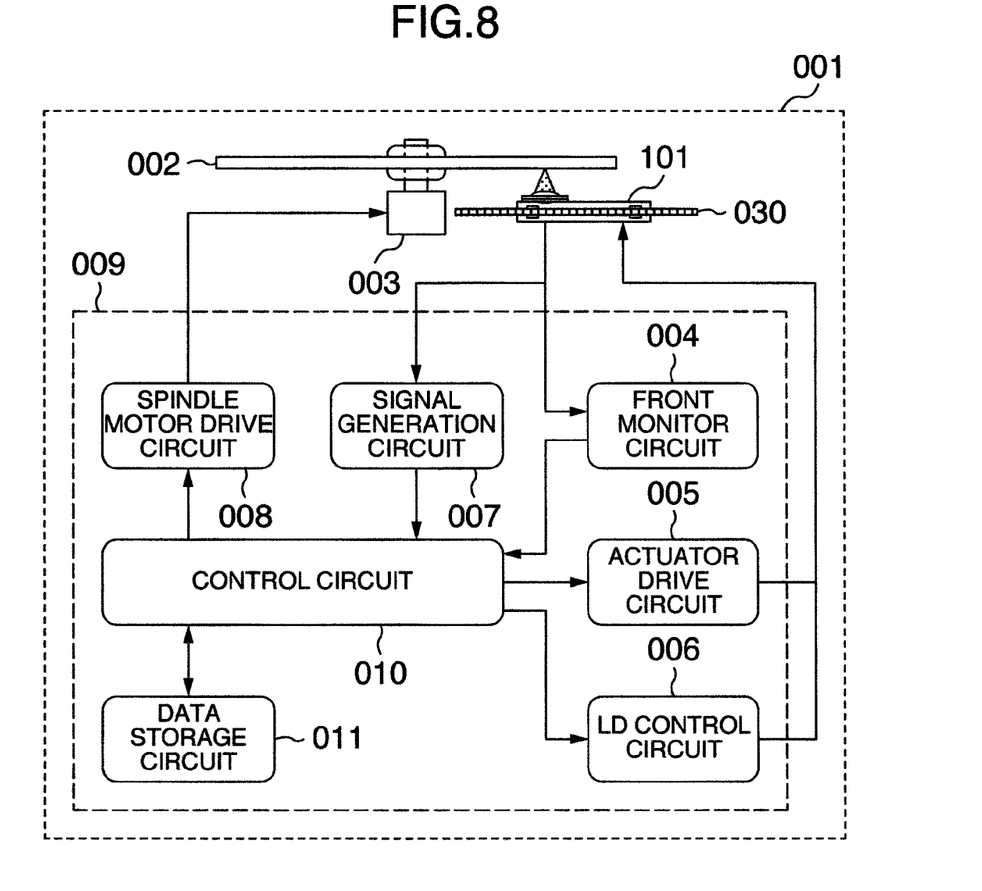
FIG. 8 is a schematic configuration diagram showing the optical disc device 001 in the first embodiment.

The optical disc device 001 will be described with reference to FIG. 8. FIG. 8 is a schematic configuration diagram showing the optical disc device 001. In the optical disc device 001, the optical disc 002 is fixed on a spindle 003, and the spindle 003 has a function for rotating the optical disc 002. A guide bar 030 is also provided in the optical disc device 001, and the optical head 101 is moved along the guide bar 030 to be able to access a predetermined radius position on the optical disc 002.

When an instruction for reproducing information on the optical disc 002 is entered into a control circuit 009 in the optical disc device 001 from an information home electronics using the optical disc device 001 attached to such as a host device, personal computer, etc., a control circuit 010 actuates a spindle motor drive circuit 008 to drive the spindle 003 and rotate the optical disc 002. Next, the control circuit 010 drives an LD control circuit 006 to turn on the LD in the optical head 101. At this time, a front monitor circuit 004 monitors the LD intensity. The control circuit 010 drives the LD control circuit 006 to feed back the LD intensity acquired from the front monitor circuit 004 in the optical head 101 to the LD control circuit 006 and turn on the LD in response to the LD intensity used for the reproduction. The control circuit 010 drives an actuator drive circuit 005 to drive the actuator 106 in the optical head 101 in a height direction of the optical disc device 001. A signal detected from the optical detector 108 in the optical head 101 is sent to a signal generation circuit 007 to generate a servo signal of the FE and TE. The generated servo signal is sent to the actuator drive circuit 005 from the control circuit 010, as required, to drive the actuator 106 in the optical head 101, perform the servo control in the order of the focus control and track control, and focus and irradiate the optical beam on a predetermined track of optical disc 002. Thereafter, the detected signal from the optical detector 108 in the optical head 101 is reproduced as information signal in an information signal reproduction circuit (not shown) to be output to the host device. The optical disc device 001 provides a relation between the LD intensity acquired from the front monitor circuit 004 and the displacement amount of FE in a data storage circuit 011 in advance. The TE allowable range 137 is also stored in the data storage circuit 011 in advance.

Incidentally, when an instruction for recording information on the optical disc 002 is entered into the control circuit 009 from the host device, the operation by the time of acquiring a reproduced signal is performed, likewise to the above-mentioned reproduction. At this time, the control circuit 010 makes learn and store the displacement of FE in response to the rotation period in the data storage circuit 011. The control circuit 010 drives the actuator drive circuit 005 to turn off the focus control and lower the actuator 106. The control circuit 010 monitors the FE to thereby drive the LD control circuit 006 and raise the LD intensity in stepwise fashion such that FE does not exceed over the TE allowable range 137, in accordance with the determined operation sequence.

The control circuit 010 confirms that the LD intensity reaches the target value in the front monitor 104 by the determined operation sequence, and drives the actuator drive circuit 005 to then turn off the focus control and lower the actuator 106. The control circuit 010 monitors the FE to thereby drive the LD control circuit 006 and raise the LD intensity in stepwise fashion such that FE does not exceed the TE allowable range 137 in accordance with the determined operation sequence.

The control circuit 010 confirms that the LD intensity reaches the target value in the front monitor 104 by the determined operation sequence, and drives the actuator drive circuit 005 to then stop the instruction for lowering the actuator 106 and start the focus control. The control circuit 010 controls the LD control circuit 006 in response to a recording signal to vary the LD intensity in high speed and perform the recording on the optical disc 002, after starting the focus control. The defocus caused by the chromatic aberration is averaged for when the recording is performed while the LD intensity is varied in high speed. To this end, when the average value of LD intensity is varied largely, the defocus caused by the chromatic aberration is also averaged for when the recording is performed while affecting by the above-mentioned chromatic aberration and varying the LD intensity in high speed. For this reason, an influence of the above-mentioned chromatic aberration may be considered of when the LD intensity is varied largely.

The control circuit 010 makes perform the recording while performing an access control for the optical head 101 in response to a recorded signal and a rotation control of the optical disc 002. At the time of terminating the recording, the LD intensity is fallen, but the displacement of FE generates in the positive direction by causing the chromatic aberration at this time. For this reason, the same operation mentioned above is performed to be able to return a normal reproduction condition when the LD intensity is fallen. For example, the focus control is turned off at the same time of when the recording is terminated, and the actuator 106 may be driven so as to move farther away from the optical disc 002 at once. According to the above mentioned control, it can be prevented that the objective lens 105 collides against the optical disc 002.

By driving the circuits in the optical disc device 001 as mentioned above, recorded information received from the host device can be recorded in the optical disc 002.

Figure 9:
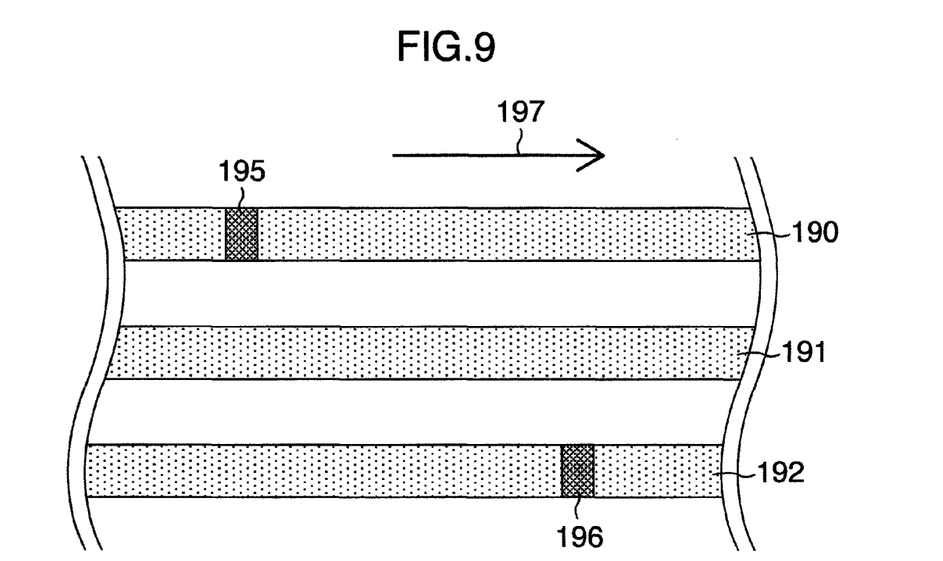
FIG. 9 is a diagram for explaining a defect processing in the first embodiment.

A defect processing will be described with reference to FIG. 9. FIG. 9 illustrates tracks on the optical disc 002, and a rotation direction of optical disc 002 is designated by an arrow 197. The optical disc 002 has tracks 190, 191 and 192, as explanation purpose. For example, in the recording, meaningless areas 195, 196, as data, generate on the tracks 190, 192 by the time of raising the LD intensity, that is, for a time period from time Ts up to time Tw. For this reason, the area 195 is registered as a defect. The defect registration can be realized by such that defect information is added to the end of a predetermined recorded signal to then record it. For example, the defect registration may be recorded in a range if this range is present in the optical disc 002.

Embodiment 2

A second embodiment in the invention will be described with reference to the drawing. Here, the recording operation different from the first embodiment will be described below.

Figure 10:
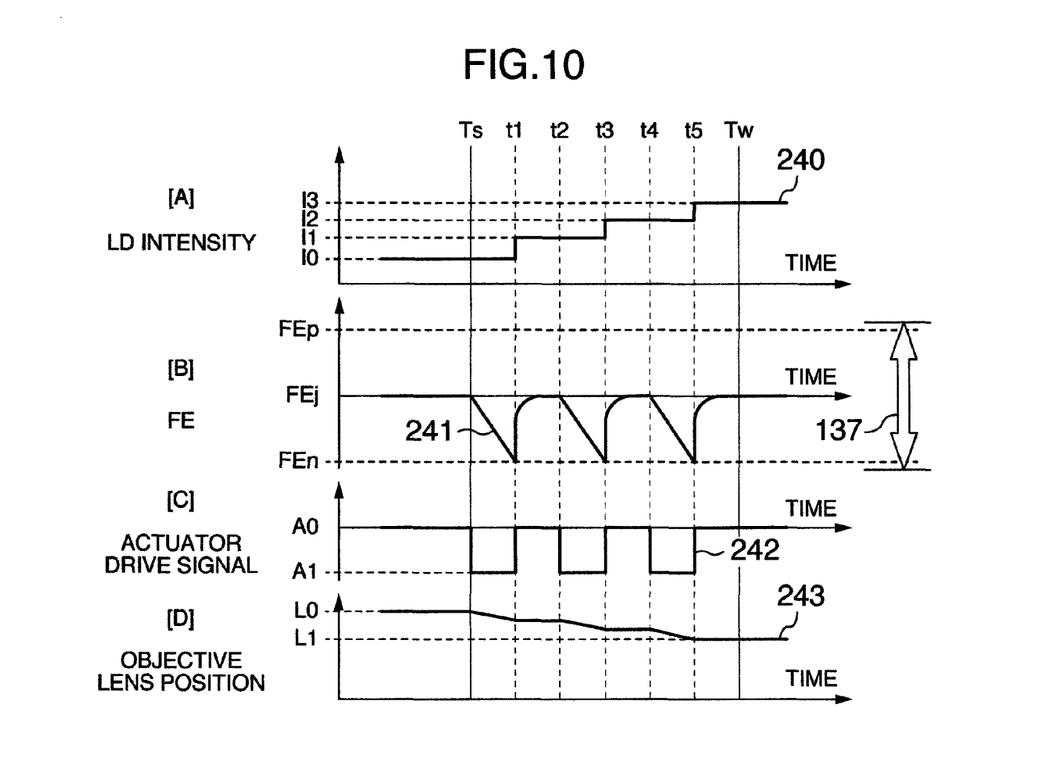
FIG. 10 is a diagram for explaining the control method for the optical disc device 001 in a second embodiment of the invention.

A control method of the optical disc device in the recording will be described with reference to FIG. 10. FIG. 10 is a diagram showing a control example in the optical disc device 001 when the LD intensity is raised from I0 in the reproduction to I3 as target. FIG. 10 has the same illustration as that in FIG. 4, therefore, the same description in FIG. 4 is omitted below. First, in the preceding time earlier time Ts, an LD intensity 240 is set to I0 in the reproduction, an 241 is set to the just-focal point FEj since the focus control is underway, an actuator drive signal 242 is set to the predetermined value A0, and an objective lens position 243 is set to the initial value L0.

The optical disc device 001 receives the recording instruction at time Ts to make the focus control stop and enter the predetermined signal A1 as the actuator drive signal 242 so as to become the out-focus. The objective lens position 243 is moved from L0 to the out-focus side by the entered actuator drive signal 242. At this time, the FE 241 is displaced to the negative side in response to the objective lens position 243.

When the FE 241 is reached to the FEn or time t1, the LD intensity is raised from I0 to I1. At a moment of raising the LD intensity to I1, the chromatic aberration generates in the optical beam. For this reason, the FE 241 is displaced at a moment up to the FEj side as positive direction. The optical disc device 001 learns a relation between the LD intensity and the displacement amount of FE caused by the chromatic aberration in advance. For this reason, The LD intensity 240 can be raised such that the FE 241 moves close to the FEj.

The focus control can be started immediately since the actuator drive signal 242 is present around the FEj immediately after raising the LD intensity 240 at time t1.

The optical disc device 001 waits until the focus control becomes stable at time t2, the focus control stops temporarily after elapsing time t2, and the signal A1 is entered as the actuator drive signal 242 again so as to become the out-focus. Likewise mentioned above, the objective lens position 243 moves from L0 to the out-focus side, and the FE 241 is displaced to the negative side in response to the objective lens position 243.

When the FE 241 is reached to the FEn again or to time t3, the LD intensity 240 is raised from I1 to I2. At a moment of raising the LD intensity to I2, likewise mentioned above, the FE 241 is displaced to the FEj side for a moment.

The focus control can be started since the actuator drive signal 242 is present around the FEj immediately after raising the LD intensity 240 at time t2.

The optical disc device 001 waits until the focus control becomes stable at time t4, the focus control stops temporarily after elapsing time t4, and the signal A1 is entered as the actuator drive signal 242 in three times so as to become the out-focus. For this reason, the objective lens position 243 moves from L0 to the out-focus side, and the FE 241 is displaced to the negative side in response to the objective lens position 243.

When the FE 241 is reached to the FEn or time t5, the LD intensity 240 is raised from I2 to I3. At a moment of raising the LD intensity to I2, likewise mentioned above, the FE 241 is displaced to the FEj side for a moment.

The stable focus control can be started immediately since the actuator drive signal 242 is present around the FEj immediately after raising the LD intensity 240 at time t5. The optical disc device 001 waits until the focus control becomes stable at time Tw to then start the recording.

Even in the above-mentioned control, the track control does not become disabled, and the LD intensity can be raised up to the target. Unlike the first embodiment, an operation time is required for turning the focus control on and off, but it can be said that the above-mentioned control is more stable than that of the first embodiment since the time when the focus control becomes off is short.

In addition, when the LD intensity 240 is raised from I2 up to I3 as target and a necessary raising amount of the LD intensity is smaller than the displacement from the FEn to FEj, it is definitely unnecessary to wait until the FE 241 becomes the FEn, and it is also acceptable that the LD intensity 240 raises to a value to be present in between the FEj and FEn.

In the embodiments, the example has been described for raising the LD intensity from I0 up to I3 in the three steps, but it is also acceptable to raise it in two or four steps. In this case, the FE 241 may be monitored not so as to exceed over the TE allowable range 137.

The displacement of FE 241 for the actuator drive signal 242 to be applied between time Ts and time t1 is stored, as data, in the optical disc device 001. In this way, the above-mentioned operation can be realized, without monitoring the FE, even in the manner that waits for only the time between time Ts and time t1 after entering the actuator drive signal 242.

Figure 11:
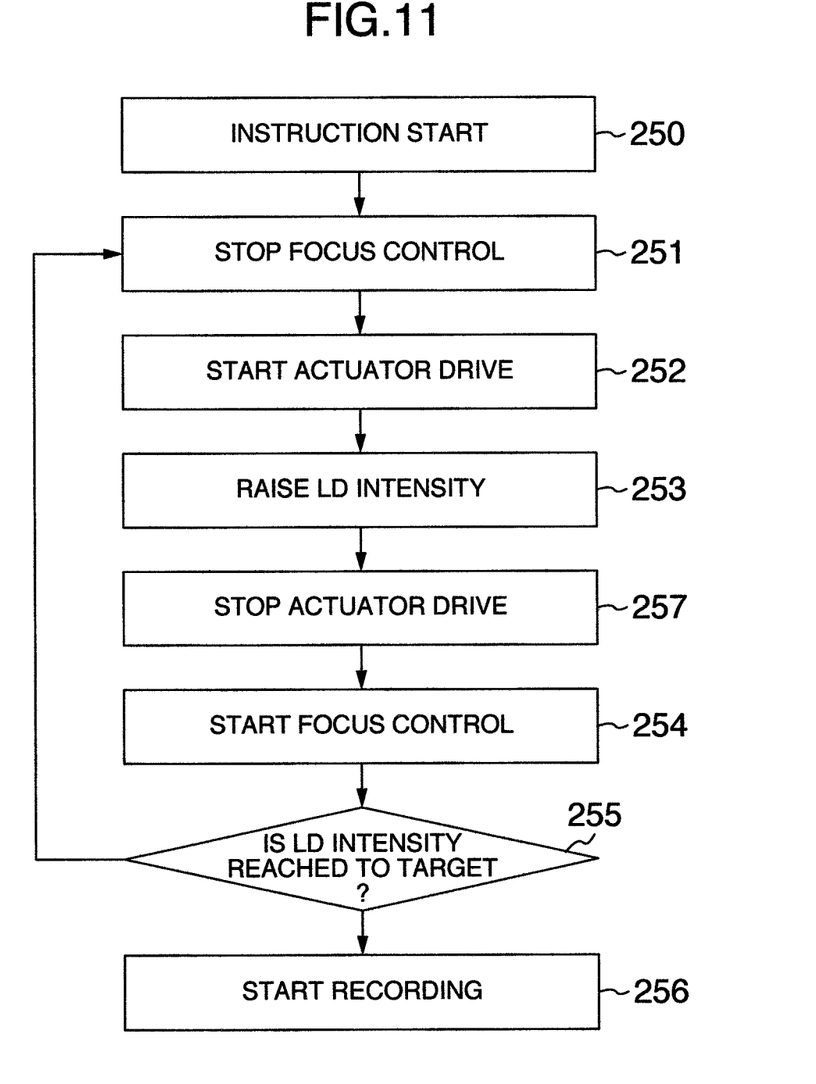
FIG. 11 is a flowchart showing the operation sequence of the optical disc device in the second embodiment.

Next, an operation sequence for raising the LD intensity in the recording will be described with reference to FIG. 11. It is assumed that the optical disc device 001 in the operation sequence stores the displacement, as data, of FE 241 for the actuator drive signal 242 at between time Ts and time t1.

The optical disc device 001 receives an instruction for starting the recording operation at a step 250, and the focus control is made stop at a step 251. The actuator drive signal 242 is infused at a step 252. The LD intensity is raised after elapsing a predetermined time period, at a step 253. Subsequently, the actuator drive signal 242 is stopped to infuse at a step 257, and the focus control starts at step 254. At this time, the LD intensity is monitored by the front monitor 104 at a step 255. If the LD intensity does not reach the target, the focus control is turned off again and the process from the step 251 to step 255 is repeated until the LD intensity reaches the target. The recording starts at a step 256, after the LD intensity reaches the target by confirming in the front monitor 104 at the step 255.

The LD intensity can be raised up to the target without monitoring the FE, by holding the displacement, as data, of FE 241 at between time Ts and time t1. That is, it can be said that the elapsed time is required, but the control can simply be performed rather than the first embodiment.

Embodiment 3

A third embodiment in the invention will be described with reference to the drawing. Here, the recording operation different from the first embodiment will be described below.

Figure 12:
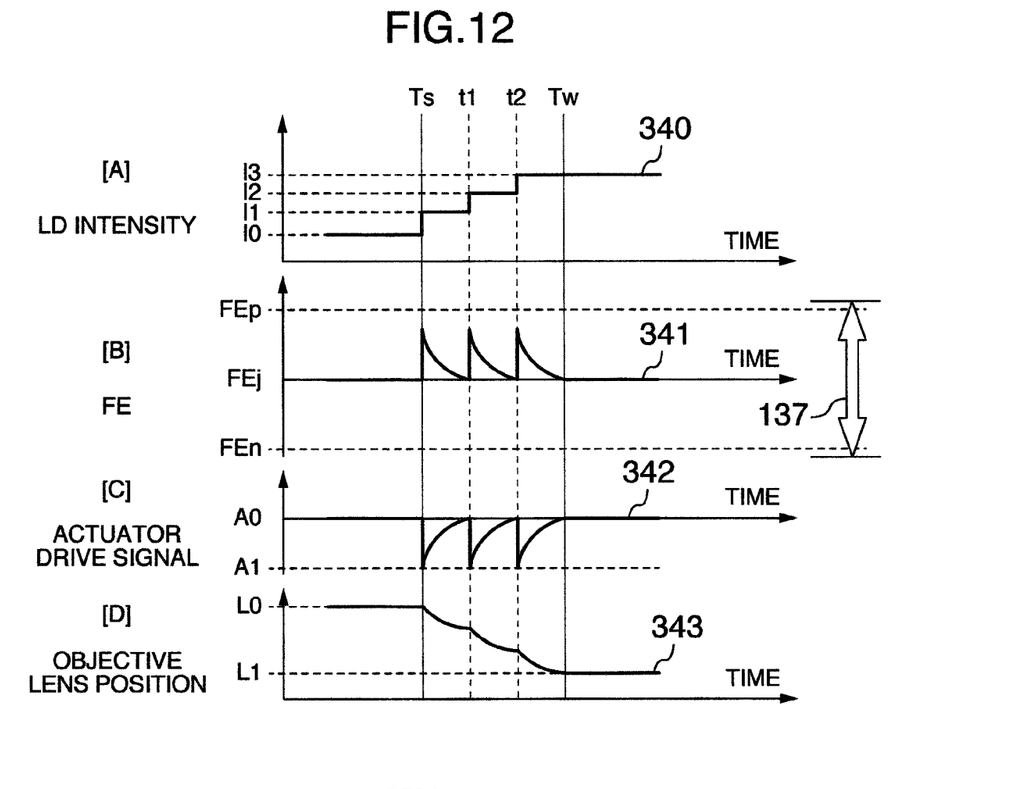
FIG. 12 is a diagram for explaining the control method for the optical disc device 001 in a third embodiment of the invention.

A control method of the optical disc device 001 in the recording will be described with reference to FIG. 12. FIG. 12 shows a control example in the optical disc device 001 when the LD intensity is raised from I0 to I3 as target in the reproduction. FIG. 12 has the same illustration as that in FIG. 4, therefore, the already explained description is omitted. First, in the preceding time earlier than time Ts, an LD intensity 340 is set to I0 in the reproduction, an FE 341 is set to the just-focal point FEj since the focus control is underway, an actuator drive signal 342 is set to the predetermined value A0, and an objective lens position 243 is set to the initial value L0.

The optical disc device 001 receives the recording instruction at time Ts to raise the LD intensity 340 from I0 to I1. The optical disc device 001 learns a relation between the LD intensity and the displacement amount of FE caused by the chromatic aberration in advance and sets a difference between I0 and I1 in a range for which the focus control does not become disabled, that is, the FE does not exceed over the FEp. For a moment of raising the LD intensity 340 to I1, the FE 341 is moved in the positive direction by causing the chromatic aberration. In the third embodiment, a condition where the focus control is continued is assumed. For this reason, the focus control is performed such that the FE is targeted to the FEj. At this time, the actuator drive signal 342 is output as a reversed signal of a difference signal between the FEj and FEp in response to an FE waveform. The objective lens position 343 varies its position in response to the actuator drive signal 342.

The optical disc device 001 takes a waiting time until the focus control becomes stable at time t1 to raise the LD intensity from I1 to I2. At a moment of raising the LD intensity to I2, likewise, the FE 341 is displaced in the positive direction, and immediately after, the focus control for targeting the FEj is performed. At this time, the actuator drive signal 342 is output as the reversed signal of the difference signal between the FEj and FEp in response to the FE waveform. The objective lens position 343 varies its position in response to the actuator drive signal 342.

The optical disc device 001 takes the waiting time until the focus control becomes stable at time t2 to raise the LD intensity 340 from I2 to I3 as target. At a moment of raising the LD intensity 340 to I3, likewise mentioned above, the FE 341 is displaced in the positive direction, and immediately after, the focus control for targeting the FEj is performed. At this time, the actuator drive signal 342 is output as the reversed signal of the difference signal between the FEj and FEp in response to the FE waveform, as likewise mentioned above. The objective lens position 343 varies its position up to L1 corresponding to the actuator drive signal 342. The optical disc device 001 waits until the focus control becomes stable at time Tw to then start the recording.

By controlling as mentioned above, it enables that the LD intensity raises up to the target while performing the focus control and track control. Unlike the first and second embodiment, the waiting time is required until the focus control becomes stable since the focus control continues, but it can be said that the control is simple rather than the first and second embodiment since there is no switching operation for the focus control. In also this case, it is important that the raising amount of LD intensity is set not so as to exceed over the TE allowable range 137.

Figure 13:
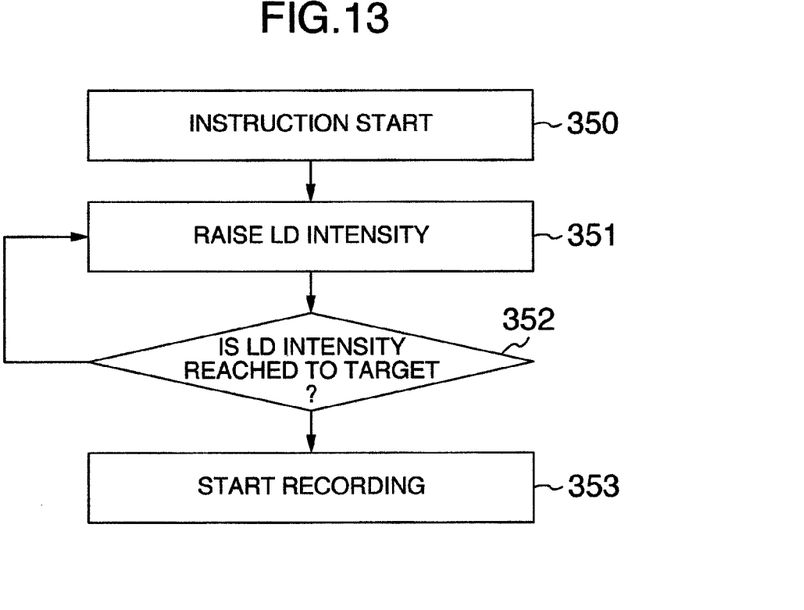
FIG. 13 is a flowchart showing the operation sequence for the optical disc device 001 in the third embodiment.

An operation sequence for raising the LD intensity will be described with reference to FIG. 13.

The optical disc device 001 receives an instruction for starting the recording operation at a step 350, and the LD intensity is then raised at a step 351. Next, the LD intensity is monitored by the front monitor 104 to determine whether the LD intensity reaches the target at a step 352. If the LD intensity does not reach the target, the process repeats until the LD intensity reaches the target in such a way that the LD intensity is raised again when the focus control become stable at the steps 351, 352. If the LD intensity reaches the target value, confirmed by the front monitor 104 at the step 352, the recording can be started at a step 353. As mentioned above, the LD intensity can be raised up to the target without monitoring the FE and turning on and off the focus control. That is, the waiting time is required, but it can be said that the control is simple rather than the first and second embodiment.

Embodiment 4

A fourth embodiment will be described with reference to the drawing. Here, a method of reducing the defect is described by reference to the first embodiment.

Figure 14:
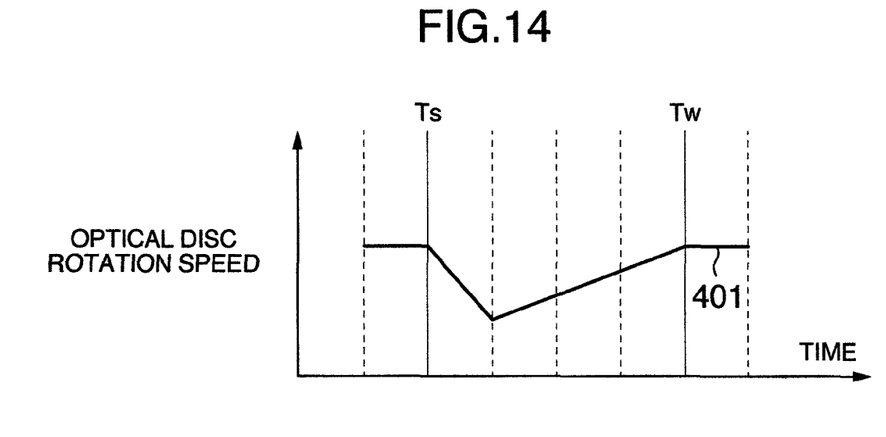
FIG. 14 is a diagram for explaining a first control method of a rotation speed in a fourth embodiment of the invention.

A first rotation control method of the optical disc will be described with reference to FIG. 14. FIG. 14 is a diagram showing a time on the horizontal axis and a rotation speed of the optical disc on the vertical axis. For a purpose of making a defect area small, the rotation speed of optical disc 002 is lowered for the time period between time Ts and Tw by the time of when the recording can be started, to be able to make the defect area small virtually. For this reason, as rotation speed 401 shown in FIG. 14, the rotation speed of optical disc 002 is lowered at the same time of starting the above-mentioned other process at the time Ts when the recording starts. The rotation speed is changed to such that it becomes original when the LD intensity becomes a value for recording. As mentioned above, it enables that the defect area is made small by changing the rotation speed.

A second rotation control method of the optical disc 002 will be described as a deforming example of the rotation control by reference to FIG. 15 equivalent to FIG. 14. This assumes that the rotation speed is made different in the reproduction and recording. For the purpose of making the defect area small virtually, a reproduction adjustment is performed by a low speed as a rotation speed 402 shown in FIG. 15, and the rotation speed is changed to such that it becomes a predetermined rotation speed of optical disc 002 when the LD intensity becomes a value for recording. As mentioned above, it enables that the defect area is made small by changing the rotation speed.

Figure 15:
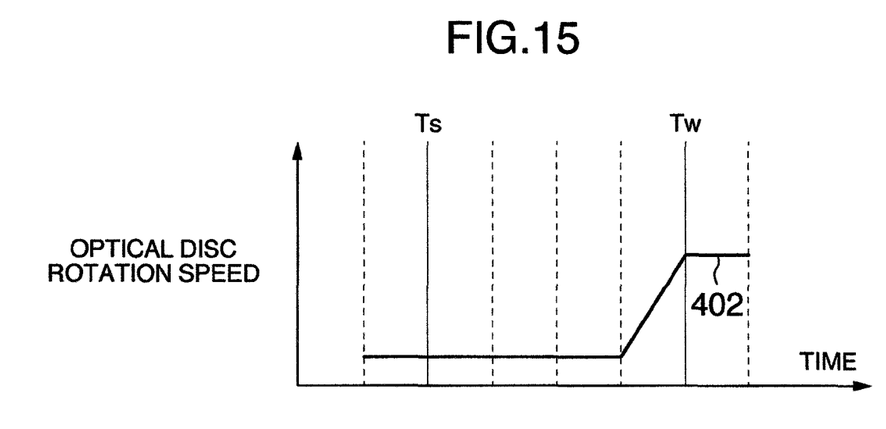
FIG. 15 is a diagram for explaining a second control method of the rotation speed in the fourth embodiment.

As shown in FIG. 14 and FIG. 15, the substantive defect area can be made small by lowering the rotation speed of optical disc 002.

The optical disc device 001 in the embodiments starts the recording after the LD intensity becomes the value for recording as mentioned above, that is, the recording from time Tw, but the recording may start from time Ts of the recording start. In this case, since the time Ts to Tw becomes an area for which the reproduction cannot be performed later, a processing for recording data for the time from Ts to Tw again may be performed after the recording is terminated for predetermined recorded data.

In the embodiments, the operation has been described in raising the LD intensity, conversely, the operation may also be described in falling the LD intensity. The embodiment is not limited to the description therein if the operation is used for varying the LD intensity, and may also be applied to the operation for when returning to reproduction from the recording.

In the description of the embodiments, the optical head 101 has one LD, but two or three LD may also be acceptable. For example, in the case of the optical head mounting a compatible objective lens using the diffraction phenomenon corresponding to three media such as BD, DVD and CD, it has a large chromatic aberration as pointed out a problem. It can be said that the invention is valid for the above-mentioned optical head.

As mentioned above, the optical disc device 001 in the embodiments provides at least an optical source for emitting the optical beam 121 or the LD 102, the objective lens 105 for focusing the optical beam on the optical disc 002, and an incident intensity control circuit or the LD control circuit 006 for controlling the LD intensity emitted from the LD 102.

The optical disc device in the embodiments provides the control circuit 010 for controlling the LD control circuit 006 in the manner that, when the LD intensity changes from a first optical beam intensity I0 to a second optical beam intensity I3 different from the first optical beam intensity I0, the change is achieved through the implementation of the operations of the LD control circuit 006 at the LD intensities I1 and I2.

The optical disc device in the embodiments also provides the optical detector 108 for receiving the optical beam 121 reflected from the optical disc 002, and a servo signal generation circuit or the signal generation circuit 007 for generating the FE from the optical detector 108. The control circuit 010 controls the LD control circuit 006 so as to suppress the variation of FE to a predetermined first range or the TE allowable range 137, when varying the intensity once.

The optical disc device 001 in the embodiments provides an objective lens drive device or the actuator 106 capable of driving the objective lens position at least in the normal direction and radius direction of the optical disc 002, and an objective lens position control circuit or the actuator drive circuit 005 for controlling the actuator 106. The signal generation circuit 007 provides a function for generating the TE from the optical detector 108. The control circuit 010 provides a function for controlling the actuator drive circuit 005 so as to follow up a predetermined track by the optical beam 121 on the basis of the TE. The TE allowable range 137 is set to a range capable of following up the track by the actuator drive circuit 005.

TE allowable range 137 is set to a range smaller than a half of TE amplitude.

The control circuit 010 of the optical disc device 001 in the first and second embodiment provides a function for controlling the actuator drive circuit 005 in such a way that the objective lens 105 is driven in the normal direction of optical disc 002 at the same time or earlier than the time when the LD intensity is varied by the LD control circuit 006 in varying the LD intensity from I0 to I3.

The optical disc device 001 in the first embodiment has a function for varying the LD intensity by the LD control circuit 006 so as to vary the FE up to FEp in such a way that, when one TE allowable range 137 is set to a first threshold value or the FEn and the other is set to a second threshold value or FEp and the LD intensity is varied from I0 to I3, the control circuit 010 controls the actuator drive circuit 005 so as to drive the objective lens 105 in the normal direction of optical disc 002.

The optical disc device 001 in the first embodiment provides the data storage circuit 011 for storing a control amount, generated from the LD control circuit 006, required for varying the FE to FEn or FEp when the objective lens 105 is driven in the normal direction of optical disc 002, and has a function for reading out the control amount from the data storage circuit 011 by the control of control circuit 010 to control the actuator drive circuit 005 to thereafter vary the LD intensity by the LD control circuit 006, when the LD intensity varies from I0 to I3.

The optical disc device 001 in the embodiments has a function for varying the rotation speed of optical disc 002 at least once for the time during which the LD intensity varies from I0 to I3 in the recording on the optical disc 002, when I0 is set to the LD intensity required for the reproduction and I3 is set to the LD intensity required for the recording.

The optical disc device in the embodiments has a function for handling a track area, as a defect area, irradiated by the optical beam 121 for the time during which the LD intensity varies from I0 to I3 in the recording on the optical disc 002, when I0 is set to the LD intensity required for the reproduction and I3 is set to the LD intensity required for the recording.

The optical disc device in the embodiment provides an optical intensity detector or the front monitor 104 for detecting the LD intensity of the incident optical beam 121 and has a function for controlling the LD control circuit 006 in response to the signal from the front monitor 104 by the control circuit 010.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc device, comprising:
an optical source that emits an optical beam;
an objective lens that focuses the optical beam on an optical disc;
an incident intensity control circuit that controls an intensity of the optical beam emitted from the optical source;
a control circuit that controls the incident intensity control circuit such that the intensity of the optical beam is varied once to a third optical beam intensity to be present in between a first optical beam intensity and a second optical beam intensity when the intensity of the optical beam is varied from the first optical beam intensity as a predetermined optical beam intensity up to the second optical beam intensity different from the first optical beam intensity by the incident intensity control circuit;
an optical detector that receives the optical beam reflected from the optical disc; and
a servo signal generation circuit that generates a focus error signal from the optical detector, wherein
the control circuit has a function for controlling the incident intensity control circuit such that a displacement of the focus error signal is present in a predetermined range, when the intensity of the optical beam is varied from the first optical beam intensity to the third optical beam intensity.

2. The device according to claim 1 further comprising:
an objective lens drive device that moves a position of the objective lens at least in a normal direction and a radius direction; and
an objective lens position control circuit that controls the objective lens drive device, wherein
the servo signal generation circuit has a function for generating a track error signal from the optical detector, and
the control circuit has a function for controlling the objective lens position control circuit such that the optical beam follows up a predetermined track in accordance with the track error signal, and
the predetermined range is a range for which the objective lens position control circuit follows up the track.

3. The device according to claim 2 wherein
the predetermined range is set smaller than a range for which an amplitude of the track error signal becomes half.

4. The device according to claim 2 wherein
the control circuit controls such that a drive start time for driving the objective lens in the normal direction of the optical disc is substantially equivalent to a variation start time for varying the intensity of the optical beam by the incident intensity control circuit or earlier than the variation start time, when varying from the first optical beam intensity up to the second optical beam intensity.

5. The device according to claim 2 wherein
one end of the predetermined range is set to a first threshold value and the other end thereof is set to a second threshold value,
the control circuit controls the objective lens drive device such that the objective lens is driven in the normal direction of the optical disc, when varying from the first optical beam intensity up to the second optical beam intensity, and
the incident intensity control circuit varies the optical beam intensity such that the focus error signal is varied up to the second threshold value at a time substantially equivalent to when the focus error signal reaches the first threshold value.

6. The device according to claim 2 further comprising
a data storage circuit that stores a control amount output from the incident intensity control circuit for setting the focus error signal to a first threshold value or a second threshold value, when one end of the predetermined range is set to the first threshold value and the other end thereof is set to the second threshold value, and
the control circuit varies the optical beam intensity by the incident intensity control circuit after reading out the control amount from the data storage circuit to control the objective lens drive device, when varying from the first optical beam intensity up to the second optical beam intensity.

7. The device according to claim 2 wherein
the first optical beam intensity is set to as an intensity required for a reproduction and the second optical beam intensity is set to as an intensity required for a recording, when recording in the optical disc, and
a rotation speed of the optical disc is varied once at least for a time when varying from the first optical beam intensity to the second optical beam intensity.

8. The device according to claim 2 wherein
the first optical beam intensity is set to as an intensity required for a reproduction and the second optical beam intensity is set to as an intensity required for a recording, when recording in the optical disc, and
an area on a track irradiated by the optical beam for a time when varying from the first optical beam intensity to the second optical beam intensity is handled as a defect area.

9. The device according to claim 7 further comprising
an optical intensity detector that detects the optical beam intensity of the optical beam, wherein
the control circuit controls the incident intensity control circuit by a signal from the optical intensity detector.

10. The device according to claim 8 further comprising
an optical intensity detector that detects the optical beam intensity of the optical beam, wherein
the control circuit controls the incident intensity control circuit by a signal from the optical intensity detector.

* * * * *